Dec. 22, 1931.  H. B. MARVIN ET AL  1,837,913
ELECTRICAL INDICATING INSTRUMENT
Filed Jan. 15, 1925

Inventors:
Harry B. Marvin,
Joseph K. Leibing,
by *Alexander F. Lount*
Their Attorney.

Patented Dec. 22, 1931

1,837,913

UNITED STATES PATENT OFFICE

HARRY B. MARVIN, OF SCHENECTADY, AND JOSEPH K. LEIBING, OF NISKAYUNA, NEW YORK, ASSIGNORS TO GENERAL ELECTRIC COMPANY, A CORPORATION OF NEW YORK

ELECTRICAL INDICATING INSTRUMENT

Application filed January 15, 1925. Serial No. 2,712.

The present invention relates to improvements in means for and method of measuring, recording or indicating small voltages and more specifically to that type of apparatus known as electrocardiographs.

One of the objects of the invention is to provide a portable, easily operated apparatus for indicating and recording voltages of small magnitude such, for example, as those produced in the human body.

Another object of the invention is to provide means for adjusting the recording feature of the apparatus so as to make the record conform to a given standard of comparison at any time without necessitating a shut-down for testing and calibration.

A still further object of the invention is to provide an electrocardiograph or similar instrument which shall be responsive to voltage variations and not dependent upon the fluctuations in the resistance of the circuit whose voltage is to be measured.

Another object of the invention is to provide an electrocardiograph in which the recording means and the patient or measuring circuit are entirely separated and independent of each other so that characteristics of one will not affect the other.

Further objects and advantages of the invention will be pointed out in the specification and claims.

The operation of an electrocardiograph is based upon the fact that the action of the heart in the human body is accompanied by voltage impulses of the order of about .001 volt between the limbs. By studying the characteristics of such impulses when they are recorded as continuous waves on a light-sensitive surface such as a photographic film or bromide paper strip physicians are enabled to determine certain facts concerning the condition of the heart.

The instrument used for detecting such weak voltage waves must be extremely sensitive and capable of following all variations of the generated wave. The usual type of electrocardiograph is similar in operation to an oscillograph and the free period of oscillation is usually greater than 1/100 second. If as a result of certain conditions of use, the period becomes considerably longer than this, certain momentary characteristics of the wave may be recorded inaccurately or disappear altogether, and thus produce an inaccurate cardiogram.

Because of the small voltage available and the fact that the resulting currents are also very small it has been necessary heretofore to use detecting instruments of extremely great sensitivity, preferably such as the "string" type of galvanometer. This type of instrument comprises essentially a thin conducting wire or string suspended between the poles of a powerful electromagnet. The shadow of the string when the same is illuminated and deflected is photographed by a suitable recording device. In addition to requiring an extremely heavy and rigid frame to counteract vibration this type of instrument has the disadvantage that the resistance of the conducting string ranges generally between the limits of 2000 and 6000 ohms. It will be appreciated therefore that if the "skin" resistance of a patient, which varies according to the degree of health of the patient and the nature of the electrodes used, say from 500 to 5000 ohms, is interposed in series in the galvanometer circuit the deflections obtained will be considerably reduced inasmuch as such an instrument is essentially a current responsive device and since the resulting current in the measuring circuit varies inversely as the total circuit resistance.

Wide variations in galvanometer deflections will therefore be obtained with different patients and measuring circuits unless the sensitivity of the instrument is readjusted in each case so as to insure the production of deflections of the proper magnitude. Such calibration to proper sensitivity is accomplished in the prior art instruments by interposing a suitable value of standardized voltage in circuit with the patient and adjusting the tension of the galvanometer string until deflections of the proper magnitude are secured. Owing to wide variations in the resistance of different patients, it will be found that the string tension must be varied in order to secure proper deflections in each case. Such variations in string tension, as well as in resistance, alters the free period and damping of the galvanometer system, so that when higher resistances are dealt with the period may be lengthened considerably beyond the desirable value of 1/100 second and tend to produce erroneous results. Inasmuch as these adjustments are extremely tedious and necessitate the services of a trained attendant it is apparent that the type of instrument hitherto used is suited only for hospital laboratory purposes and not adapted to be carried from place to place by the physician.

The electrocardiograph of the present invention obviates the above mentioned difficulties by the substitution of a portable, rugged type of galvanometer for the cumbersome stationary type hitherto used and by compensating for the lack of sensitivity by suitable amplification of the heart voltage used for actuating the same.

In addition to the conversion from a stationary apparatus to a portable unit by the means hereinafter described the electrocardiograph of the invention incorporates novel means for securing proper adjustment of the working parts during the operation of the machine. This adjustment is effected without the continuous calibration required during the use of the prior art types and which involved the frequent measurement of the resistance of the patient and the substitution therefor of an artificial resistance. Furthermore, with the electrocardiograph of the present invention it is not necessary to immerse the limbs of the patient in salt solutions in order to secure electrical contact free from variable resistance, ordinary metal clamps being sufficient to place the patient in circuit relation with the apparatus.

The invention will be more clearly understood by reference to the following specification and its accompanying drawings while the novel features of the device will be pointed out in the appended claims.

In the drawings

Figure 1:
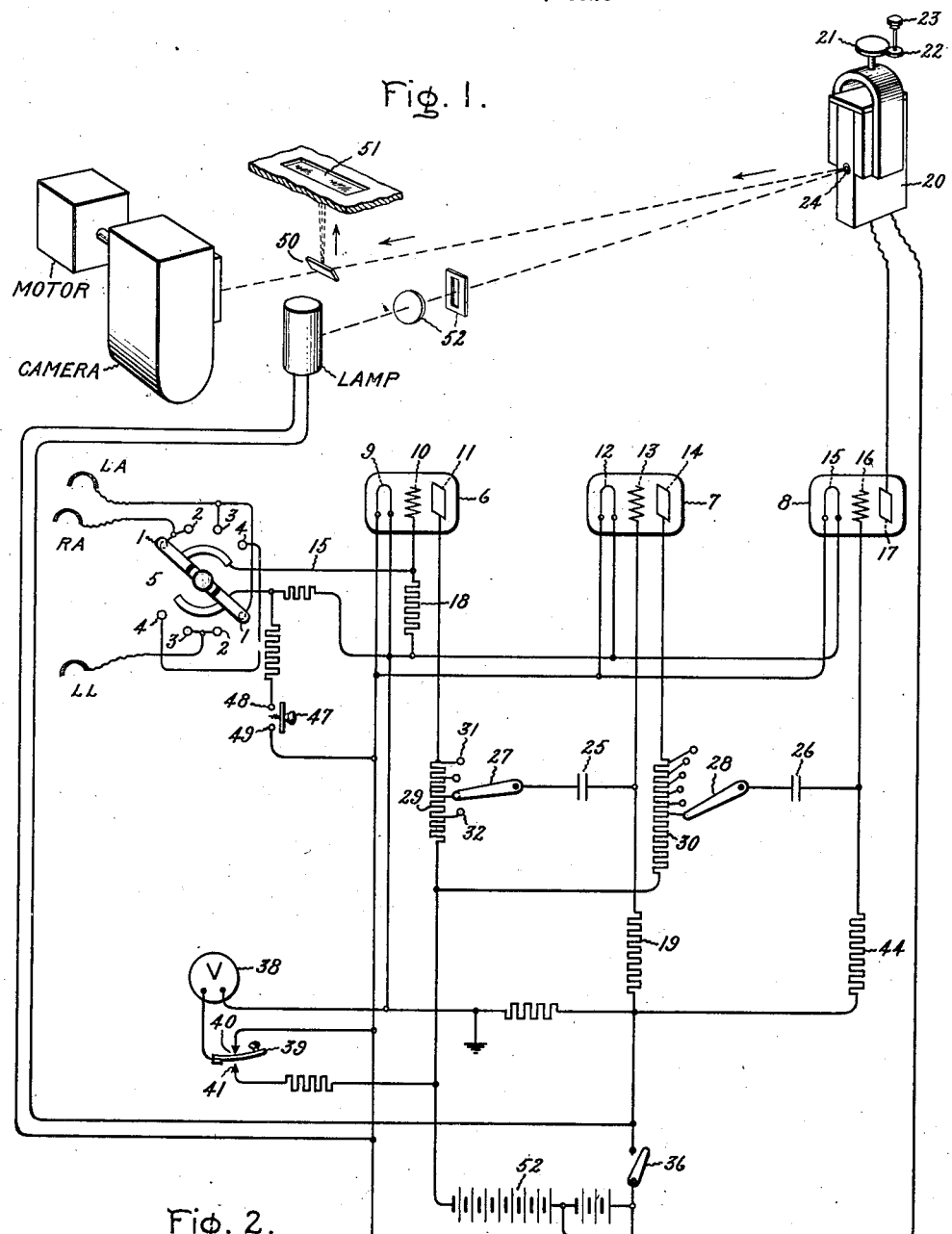
Fig. 1 shows a schematic diagram of the working elements of the electrocardiograph.

Referring in detail to Fig. 1, the electrocardiograph comprises essentially a vacuum tube circuit adapted to amplify the voltage produced in the heart to a degree at which it will be capable of actuating a portable recording instrument as hereinafter more fully described and in which the associated instruments are equally portable.

A plurality of electrodes LA RA LL are provided corresponding respectively to the left arm, right arm, and left leg of the patient to which they are to be strapped. These electrodes lead to a selector switch 5 whose contact pairs 1, 2, 3, 4 correspond to the electrode combinations it is desired to secure. In measuring the voltage in the heart it is found that the voltage varies according to the direction of the axis of the heart so that it may be desirable to secure various combinations of readings, for example, from the left arm through the heart to the right arm, or from the right arm through the heart to the left leg, or from the left leg to the left arm.

The operation of the apparatus is based upon the fact that the voltage of the patient or other measuring circuit operates the grid circuits of suitable amplifier tubes and after several stages of amplification these voltages develop proportional variations in the output current of the last tube of the set which current variations in turn produce proportional deflections in the galvanometer beam. It is evident from this that the magnitude of the galvanometer deflections will depend not only upon the magnitude of the original voltages, but also upon the efficiency of the amplifier. If the efficiency of the amplifier is increased or decreased the deflections corresponding to a given magnitude of voltage will be proportionally increased or decreased. Thus by varying the efficiency of the amplifier the magnitude of the deflection with relation to the magnitude of the body voltage may be varied as desired. With our invention it is thus unnecessary to alter the string tension of the galvanometer to secure suitable deflections and sensitivities as may be needed, and the objectionable feature of having to use too long a free period for certain patients as previously pointed out is thereby eliminated.

Referring more specifically to the drawings, the lead 15 coming from the selector is connected to the grid 10 of the vacuum tube 6 whose other elements comprise cathode 9 and anode 11. The succeeding tubes are indicated by 7 and 8 respectively and their corresponding elements by 12, 13, 14 and 15, 16, 17. Resistances 29 and 30 are placed in the plate circuits of the tubes 6 and 7 respectively for the purpose of securing suitable voltage amplification. The last stage represented by the tube 8 contains no amplifying resistance but is connected directly to the oscillographic galvanometer 20 hereinafter referred to in greater detail in connection with the optical equipment associated therewith.

The condensers 25 and 26 connect their respective grid circuits to the anode circuit of the preceding stage. Grid leaks 18, 19, and 44 connect the respective grids to the proper filament circuits.

The coupling condensers 25 and 26 are connected to the immediately preceding tube circuits by means of switches 27 and 28 which are each provided with a plurality of contacts connected to tap on the resistances 29 and 30. The purpose of this feature is to furnish means for varying the amplification of the equipment and thus permit of adjusting the deflections of the galvanometer to the correct magnitude for a given value of input voltage. By this means the effective sensitivity of the electrocardiograph as a whole for a given input voltage at the terminals of the selector switch 5 may be altered as desired without in any way affecting the damping characteristics or free period of the galvanometer.

In the resistance 29 the point of greatest potential variation is immediately adjacent to the tube plate, i. e. at 31. The point of least variation is located at the other extremity 32. Hence as the contact arm 27 is moved from one extremity to the other the potential variations impressed upon the grid of tube 7 through condenser 25 are increased or diminished according to the direction of motion of the arm, thus causing corresponding changes of overall amplification for the entire system. Contact arm 28 also permits of the connection of the grid of tube 8 to points of different potential variation, but in this case the resistance steps are made smaller than in the case of 29. The total alteration in amplification between the extreme points of the finely graded resistance steps of 30 should preferably not much exceed that which occurs between single steps of the coarser resistance steps of 29. The two resistances and their associated contact arms thus afford a means for adjusting the amplification to a very precise degree.

It is to be noted that the total resistance 29 and 30 in the plate circuits of tubes 6 and 7 is not altered by the various positions of the contact arms 27 and 28, hence the amount of steady plate current in the tubes is not altered by the setting of the contacts which merely act as potentiometer taps for feeding potential to the coupling condensers. This method of accurately adjusting the amount of amplification over a wide range is therefore superior to any method involving an actual change in the plate circuit resistance and which might tend to operate the tubes at unsuitable current values and give unfavorable results such as lack of scale uniformity in the galvanometer deflections, excessive plate currents, etc. By placing the coarse and fine adjustments in separate stages the electrical connections are simplified and the circuit will operate more satisfactorily than if both are placed in a single stage. Very precise overall calibration of the amplifier set will thus be obtained.

Inasmuch as the resistance from grid to filament is practically infinite in tube 6 or of the order of several megohms if a grid leak 18 is used, the interposition of a few thousand ohms more or less in series with the patient will have but a negligible effect upon the amount of voltage delivered to the grid circuit, that is, the voltage drop between the terminals of the selector switch 5. Hence, the resistance of the skin of the patient ordinarily will not affect the galvanometer deflections or sensitivity.

The amplifying apparatus may be protected from the effects of external or stray electrical fields by suitable metal shields arranged, for example, as a metal lining in the box in which the instrument is mounted.

The resistance coupled amplifying circuit shown in the appended drawings and described above is the preferred apparatus for amplifying the voltage of the body but it is to be understood that any suitable space current amplifying circuit may be used for the purpose by substituting suitable coupling transformers for the resistances above described, without departing from the spirit and scope of the invention.

Likewise, the coarse and fine adjusting means, in lieu of being associated with the resistances 29 and 30 may be applied to the grid resistances 19 and 44 instead. Furthermore, the coarse and fine adjustments may be associated with any two resistances, for example, 29 and 19, or 30 and 44.

The amplified voltage is delivered to the galvanometer 20 as above mentioned. This galvanometer may be of a relatively rugged, non-sensitive type as contrasted with the string type hitherto used, the main desideratum being the portability of the instrument. Means, such as gears 21, 22 operated by a knurled nut 23 may be provided for adjusting the position of the magnet in order to control the position of the reflected beam. The reflecting mirror 24 is illuminated by means of an electric lamp marked as such on the drawings and contained in a casing provided with an aperture arranged to permit a beam of light to strike the galvanometer mirror. The lamp is fed by current from the battery 53 which also supplies the filaments of the space current devices 6, 7, 8. A voltmeter 38 is provided and carries preferably two scales, one being adapted to read the voltage of the high voltage battery 52 used for operating the space current devices and the other for measuring the voltage drop of the filaments. A switch 39 provided with two contacts 40 and 41 is adapted to connect the voltmeter with the circuit of either battery at will. The beam of light coming from the lamp passes through a lens and diaphragm system 52 after which it strikes the mirror 24 of the galvanometer 20 from which it is reflected to the camera. By means of this optical system the light beam is caused to leave a record upon a strip of light-sensitive material such as motion picture film which is moved past the lens and diaphragm plane of the camera by means of a suitable driving motor preferably of the spring-operated, ball-governor type, operatively associated with the camera as shown.

Interposed in the path of the moving light beam as it is reflected by the galvanometer is a mirror 50 which is so positioned that it reflects approximately half of the beam to a scale 51 and permits the other half to pass on to the camera. The portion of the beam reflected to the scale 51 serves as a means for calibrating the galvanometer deflections so as to make them correspond to a given standard and for observing the play of the beam during the operation of the device. In electrocardiograph practice 1 millivolt producing 10 millimeters of light beam deflection on a film has been adopted as an arbitrary standard by physicians. The scale 51 is accordingly suitably calibrated in order to enable the operator to ascertain the behavior of the beam as it plays over the surface of the sensitive strip, in accordance with this standard. By momentarily operating switch 47 a "kick" or flash of light corresponding to 1 millivolt is caused to play over scale 51 and the limits within which this light is confined on the scale corresponds to the amplitude of the wave traced on the film. In practice the amplification is adjusted until the play of this flash on the scale is 10 millimeters.

Figure 2:
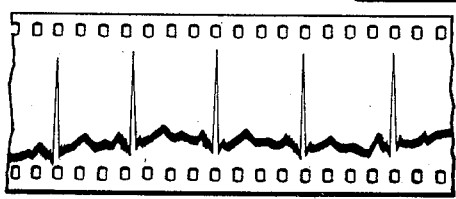
Fig. 2 illustrates an electrocardiograph record produced with the instrument of our invention.

Figure 2 shows a typical record made by the device of the invention. Distances in the vertical direction measure voltage and those in the horizontal direction indicate time, 1 mm. representing 1/25 of a second. In practice a film speed of 25 millimeters per second has been selected as an arbitrary standard.

The component parts of the electrocardiograph may be compactly disposed in a suitable box to facilitate carrying from place to place. The working elements may be mounted within the case leaving the calibration scale 51, test button 47, switch 36, voltmeter 38, control resistance arms 27, 28 and the taps associated therewith, as well as the galvanometer regulating knob 23, accessible on the cover board. The top of the camera may also be arranged to form an integral part of the top plate of the case, so that by merely inserting a slide to protect the film from light and releasing the motor from the camera by means of a suitable clutch the camera may be removed bodily from the electrocardiograph and carried to the development room. There the slide may be withdrawn and the exposed film removed for development. If many tests are to be made a number of interchangeable cameras may be kept available for convenience.

In accordance with the provisions of the patent statutes, the principle of operation of the invention has been described, together with the apparatus which is now considered to be the best embodiment thereof, but it is to be understood that the apparatus shown is only illustrative and that the invention can be carried out by other means within the scope of the appended claims. It will therefore be appreciated that while the apparatus described above is primarily intended for measuring voltages of small magnitude in a human body it is equally applicable and well suited for other measuring purposes, such as recording electrical impulses of small magnitude encountered during the measurement of leakage currents in highly insulated cables where the voltage drop across a resistance placed in series to the cable is to be measured.

What we claim as new and desire to secure by Letters Patent of the United States, is,—

1. In an electrocardiograph, the combination of amplifying means comprising a plurality of space current devices connected in resistance coupled relation, means associated with one of the space current devices for approximately and preliminarily calibrating the degree of amplification to be obtained, means associated with a succeeding space current device for more accurately calibrating the degree of said amplification and means for causing a predetermined test voltage to be applied to one of said space current devices.

2. In an electrocardiograph, the combination of an amplifier system comprising a space current device provided with an input circuit and with an output circuit including a coarsely graded resistance, a second space current device electrically coupled with the first space current device and having in its output circuit a finely graded resistance, a source of heating current arranged to be connected to the cathode of said first mentioned space current device, and means for interconnecting said source with the input circuit of said first mentioned space current device.

3. The combination of a plurality of space current devices, each provided with input and output circuits, a coarsely graded resistance connected in the output circuit of one of said devices, a finely graded resistance connected in the output circuit of another of said devices, means for coupling said devices together, a grid leak element connected in the input circuit of one of said devices, and means for causing a predetermined test voltage to be applied to said grid leak element.

In witness whereof, we have hereunto set our hands this 14th day of January, 1925.

HARRY B. MARVIN.
JOSEPH K. LEIBING.